United States Patent
Settelmayer

(10) Patent No.: US 9,845,057 B2
(45) Date of Patent: Dec. 19, 2017

(54) BICYCLE CARRIERS AND SKEWER ASSEMBLIES

(71) Applicant: Thule Sweden AB, Hillerstorp (SE)

(72) Inventor: Joseph Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/648,915

(22) Filed: Jul. 13, 2017

(65) Prior Publication Data
US 2017/0305357 A1 Oct. 26, 2017

Related U.S. Application Data

(63) Continuation of application No. 14/808,507, filed on Jul. 24, 2015, now Pat. No. 9,738,231.

(51) Int. Cl.
*B60R 9/10* (2006.01)
*B60R 9/048* (2006.01)
*E05B 71/00* (2006.01)

(52) U.S. Cl.
CPC ............... *B60R 9/10* (2013.01); *B60R 9/048* (2013.01); *E05B 71/00* (2013.01); *Y10S 224/924* (2013.01); *Y10S 411/918* (2013.01); *Y10S 411/955* (2013.01); *Y10T 70/5872* (2015.04)

(58) Field of Classification Search
CPC ............ Y10T 70/5872; Y10T 70/5854; Y10T 70/5876; Y10T 70/5836; Y10T 403/589; B60R 9/10; B60R 9/048; E05B 71/00; Y10S 411/918; Y10S 411/955; Y10S 224/924; F16B 21/12; F16B 21/16; F16B 15/00
See application file for complete search history.

(56) References Cited

U.S. PATENT DOCUMENTS

| | | |
|---|---|---|
| 3,190,168 A | 6/1965 | Sullivan |
| 4,897,008 A | 1/1990 | Parks |
| 4,938,108 A | 7/1990 | Mekler |
| 5,526,661 A | 6/1996 | Lin |
| 5,598,959 A * | 2/1997 | Lorensen ............... B60R 9/045 224/315 |
| 5,904,383 A | 5/1999 | van der Wal |

(Continued)

FOREIGN PATENT DOCUMENTS

EP 2061692 B1 11/2013
WO WO 2005035922 A1 4/2005

*Primary Examiner* — Justin Larson
(74) *Attorney, Agent, or Firm* — Sterne, Kessler, Goldstein & Fox P.L.L.C.

(57) ABSTRACT

An assembly for securing a bicycle to a vehicle having first and second fork prongs. The assembly includes an elongated skewer for mounting the first and second fork prongs of the bicycle thereon and has an end portion. A lever rotatably couples to the end portion of the elongated skewer and has a cam portion. A cam follower movably couples to the elongated skewer and engages the cam portion of the lever such that the cam follower moves along the elongated skewer as the lever rotates. The assembly also includes a lock assembly, separate from the lever and the cam follower, that locks the lever at a closed position and couples to the end portion of the elongated skewer such that the lock assembly is disposed around the end portion of the elongated skewer.

20 Claims, 13 Drawing Sheets

(56) References Cited

U.S. PATENT DOCUMENTS

| | | | |
|---|---|---|---|
| 6,494,351 B1 * | 12/2002 | Dean | B60R 9/048 224/324 |
| RE38,094 E | 4/2003 | Buchalter | |
| 6,758,380 B1 | 7/2004 | Kolda | |
| 6,761,417 B2 | 7/2004 | Denby | |
| 7,270,509 B2 | 9/2007 | Disantis et al. | |
| 7,726,529 B2 * | 6/2010 | Foley | B60R 9/048 211/20 |
| 7,757,914 B2 | 7/2010 | Book et al. | |
| 8,156,774 B2 | 4/2012 | Tribout et al. | |
| 8,196,789 B2 | 6/2012 | Kraeuter et al. | |
| 8,281,625 B2 | 10/2012 | Prescott | |
| 8,613,380 B2 | 12/2013 | Book et al. | |
| 9,163,378 B2 | 10/2015 | Doan et al. | |
| 9,523,382 B2 | 12/2016 | Blancke | |
| 2008/0087058 A1 | 4/2008 | Chang | |
| 2008/0115547 A1 | 5/2008 | Chang | |
| 2010/0154488 A1 | 6/2010 | Prescott | |
| 2015/0027175 A1 | 1/2015 | Riehm et al. | |
| 2015/0028076 A1 | 1/2015 | Budd et al. | |
| 2016/0131166 A1 | 5/2016 | Cox | |
| 2017/0021774 A1 | 1/2017 | Settelmayer | |

* cited by examiner

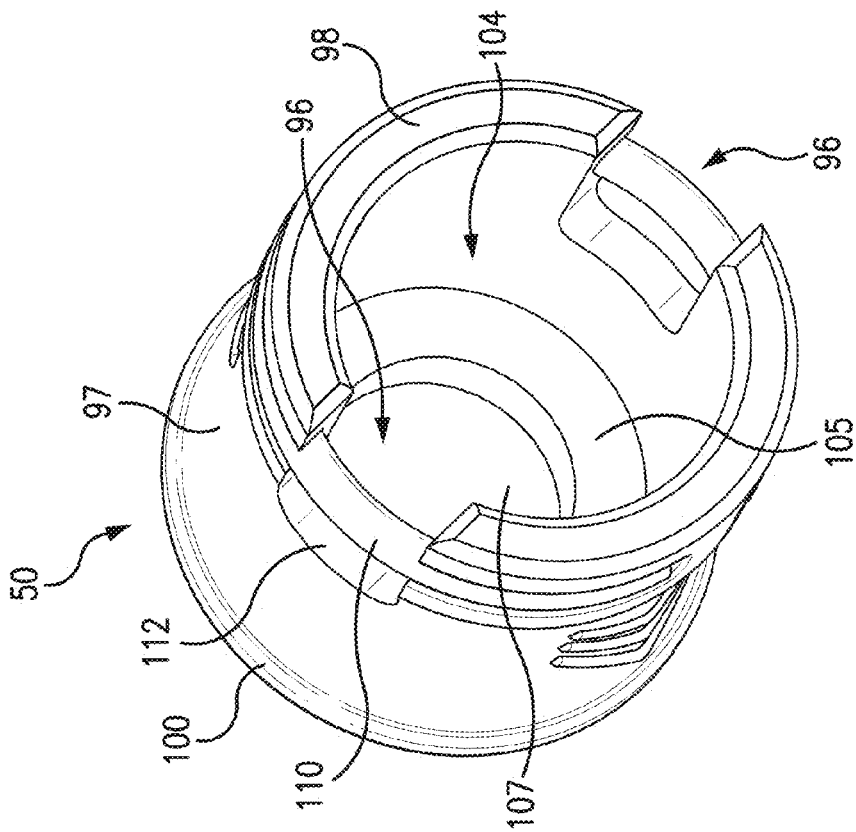
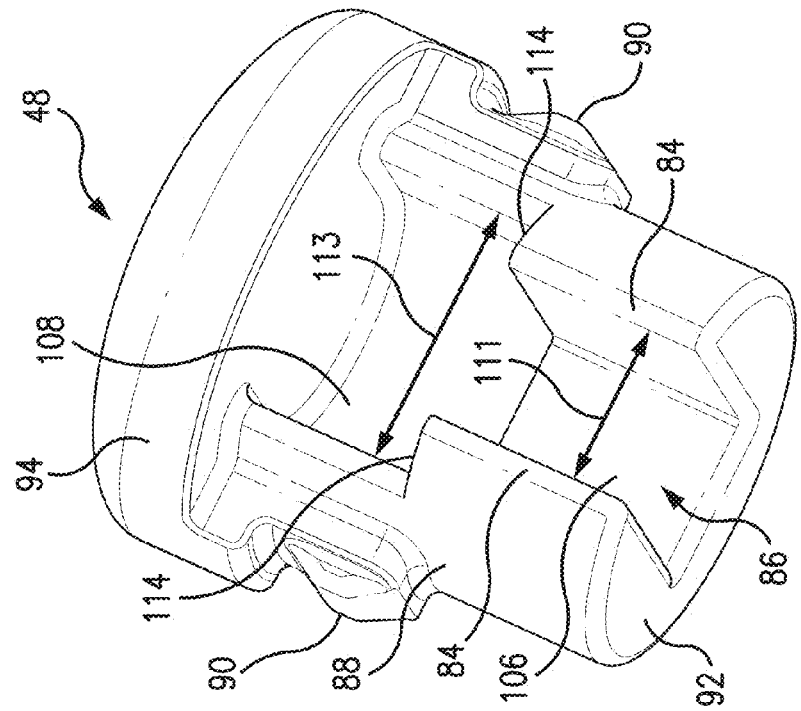

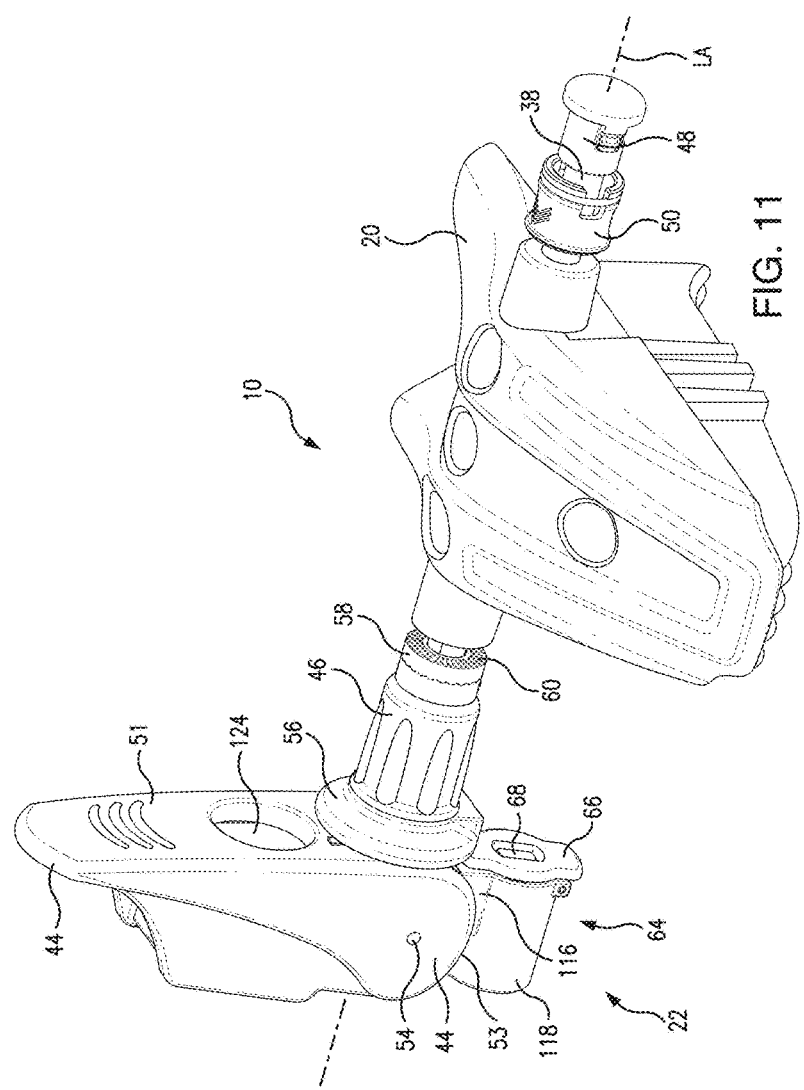

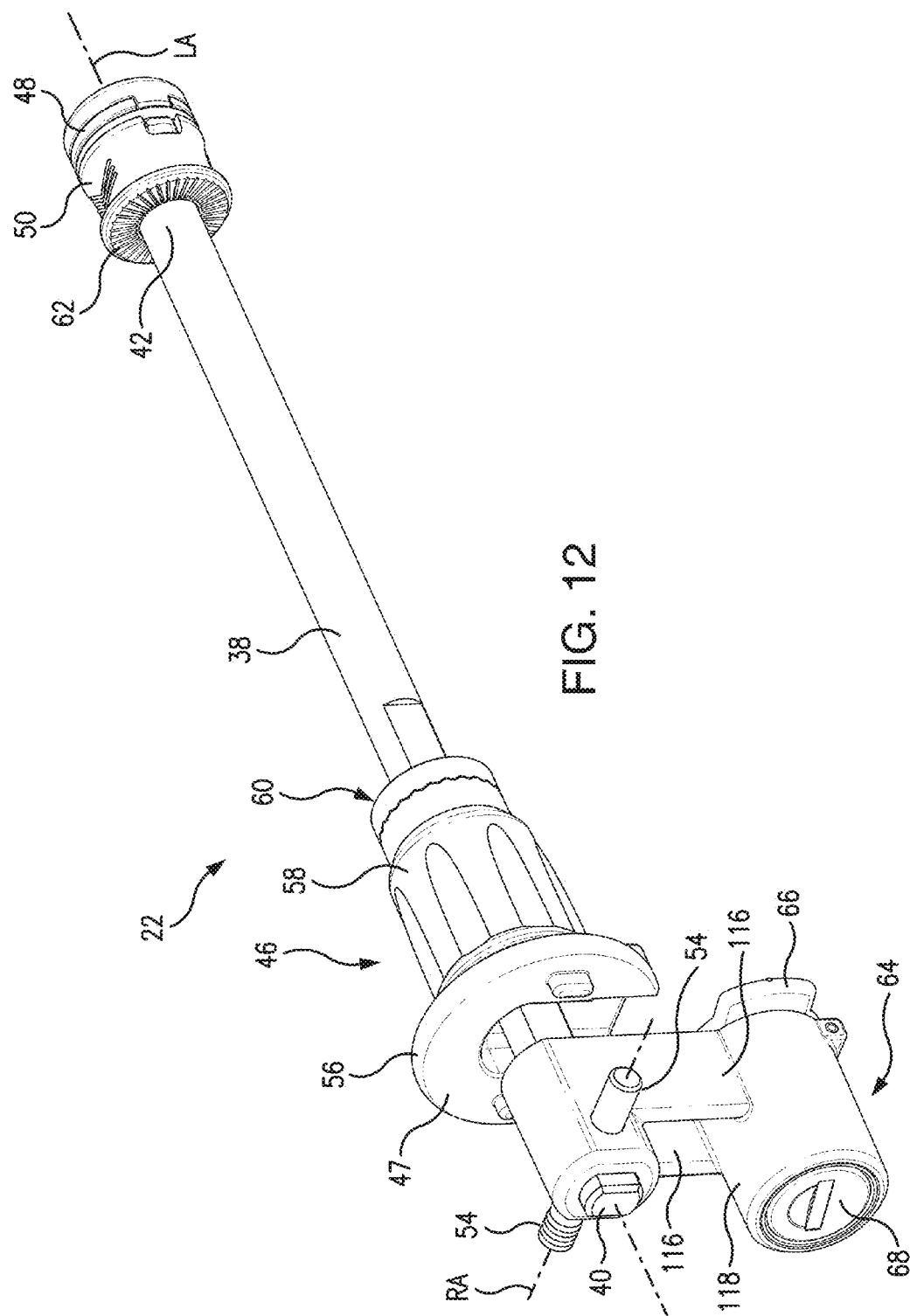

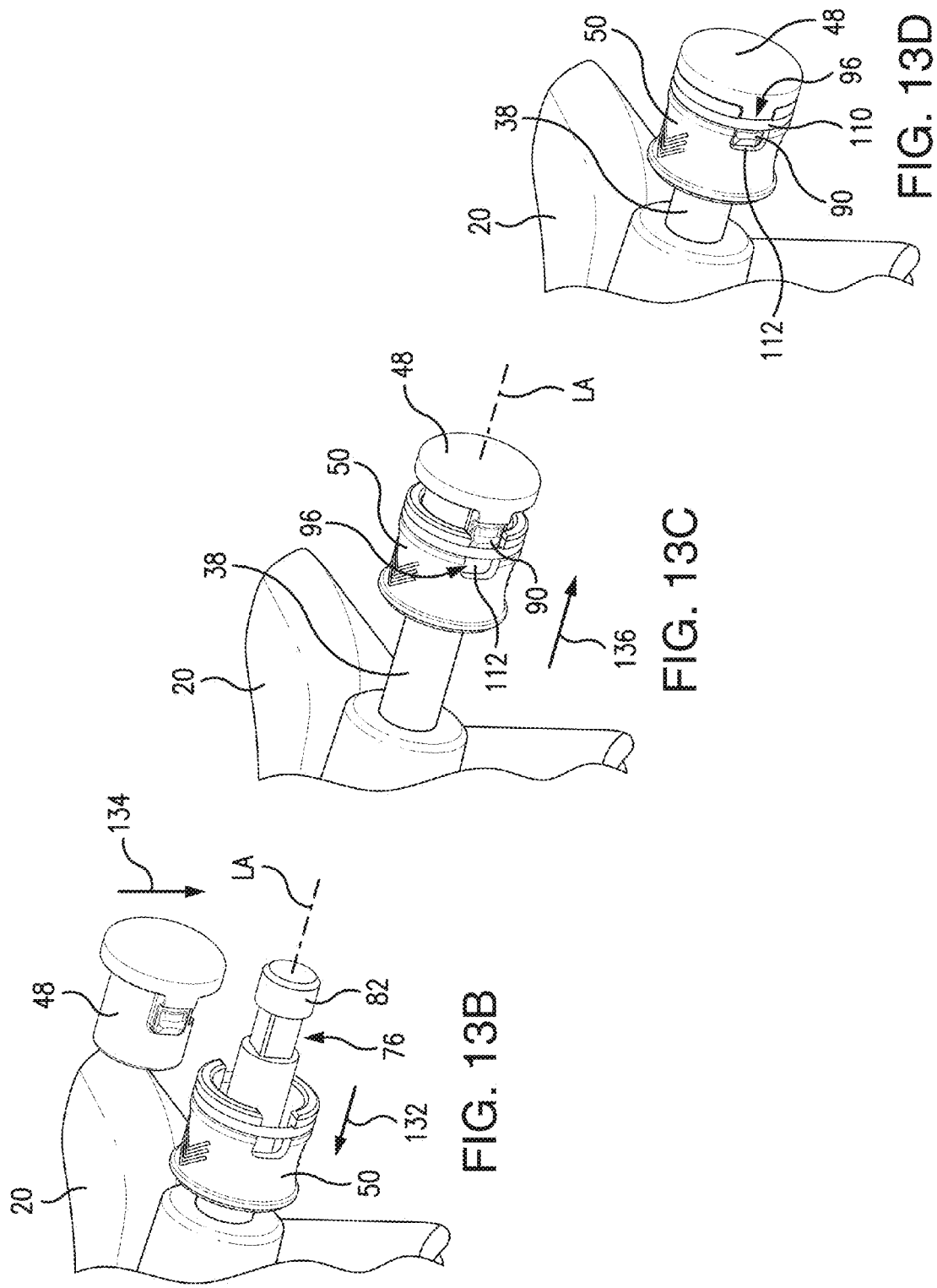

BICYCLE CARRIERS AND SKEWER ASSEMBLIES

CROSS REFERENCE TO RELATED APPLICATION

This application claims priority as a continuation to U.S. application Ser. No. 14/808,507, filed Jul. 24, 2015, which is hereby incorporated herein in its entirety by reference thereto.

BACKGROUND

Field

Embodiments of the present invention relate to carriers for securing a bicycle to a vehicle for transporting or storing the bicycle.

Background

To transport and store equipment (especially sports equipment such as one or more bicycles), the equipment can be mounted to a carrier attached to a vehicle. With one type of bicycle carrier, a fork of a bicycle is mounted to the carrier to secure the bicycle to the vehicle.

BRIEF SUMMARY

In some embodiments, an assembly secures a bicycle having first and second fork prongs to a vehicle. The assembly includes an elongated skewer for mounting the first and second fork prongs of the bicycle thereon. The elongated skewer defines a longitudinal axis and has a first end portion and a second non-threaded end portion. The assembly also includes a stop configured to be removably coupled to the second non-threaded end portion of the elongated skewer. The assembly also includes a sleeve configured to be movably coupled to the elongated skewer and configured to be removably coupled to the stop to lock the stop on the elongated skewer.

In some embodiments, the second end portion of the skewer defines a notch, and the stop has a protrusion configured to be received within the notch of the elongated skewer such that the stop translates relative to the elongated skewer in a direction perpendicular to the longitudinal axis of the elongated skewer. The sleeve defines a cavity configured to receive a portion of the stop when the protrusion of the stop is received within the notch of the elongated skewer such that a portion of the sleeve radially overlaps the portion of the stop received within the cavity of the sleeve. In some embodiments, translation of the stop relative to the elongated skewer in the direction perpendicular to the longitudinal axis of the elongated skewer is substantially prevented when the portion of the sleeve radially overlaps the portion of the stop received within the cavity of the sleeve. In some embodiments, translation of the stop relative to the elongated skewer in a direction parallel to the longitudinal axis of the elongated skewer is substantially prevented when the protrusion of the stop is received within the notch of the elongated skewer. In some embodiments, the notch of the elongated skewer extends around an entire periphery of the elongated skewer.

In some embodiments, the sleeve creates an interference fit with the stop when the sleeve is coupled to the stop. In some embodiments, the sleeve defines a recess, and the stop defines a second protrusion configured to be received within the recess of the sleeve to create the interference fit.

In some embodiments, the assembly also includes a lever rotatably coupled to the first end portion of the elongated skewer that rotates around an axis of rotation between an open position and a closed position. The lever has a cam portion. The assembly further includes a cam follower movably coupled to the elongated skewer and having a surface for applying a force to a portion of the first fork prong of the bicycle. The cam follower engages the cam portion of the lever such that the cam follower moves along the elongated skewer as the lever rotates between the open position and the closed position. The surface of the cam follower applies the force to the portion of the first fork prong of the bicycle when the lever is at the closed position. In some embodiments, translation of the sleeve in a direction parallel to the longitudinal axis of the elongated skewer is substantially prevented when the lever is at the closed position and the first and second fork prongs of the bicycle are mounted to the elongated skewer. In some embodiments, the assembly also includes a lock assembly separate from the lever and the cam follower configured to lock the lever at the closed position. In some embodiments, the lock assembly includes a rotatable cam portion that rotates to engage a surface of the lever to lock the lever at the closed position. In some embodiments, the lever has a center of mass aligned with the axis of rotation and aligned with the longitudinal axis of the elongated skewer when the lever is at the open position. In some embodiments, the cam follower includes a first portion translatably coupled to the elongated skewer and having an externally threaded portion. The cam follower also includes a second portion movably coupled to the first portion of the cam follower. The second portion defines a recess for receiving the externally threaded portion of the first portion of the cam follower, and has an internally threaded portion configured to mate with the externally threaded portion of the first portion of the cam follower. The second portion also defines the surface for applying the force to the portion of the first fork prong of the bicycle.

In some embodiments, the assembly also includes a head assembly that defines a channel configured to receive the elongated skewer. In some embodiments, the assembly further includes an elongated wheel tray that defines a recess configured to receive a wheel of the bicycle. The wheel tray is coupled to the head assembly.

In some embodiments, an assembly secures a bicycle having first and second fork prongs to a vehicle. The assembly includes an elongated skewer for mounting the first and second fork prongs of the bicycle thereon. The elongated skewer defines a longitudinal axis, and has a first end portion and a second end portion. The second end portion defines a notch. The assembly also includes a stop having a protrusion configured to be received within the notch of the elongated skewer such that translation of the stop relative to the elongated skewer in a direction parallel to the longitudinal axis of the elongated skewer is substantially prevented. The assembly also includes a sleeve configured to be movably coupled to the elongated skewer and configured to be removably coupled to the stop such that translation of the stop in a direction perpendicular to the longitudinal axis of the elongated skewer is substantially prevented.

In some embodiments, the sleeve defines a cavity that receives a portion of the stop removably coupled to the second end portion such that a portion of the sleeve radially overlaps the portion of the stop received within the cavity of the sleeve. In some embodiments, the assembly also includes a lever rotatably coupled to the first end portion of the elongated skewer and configured to rotate between an open position and a closed position. The lever includes a cam portion. The assembly further includes a cam follower movably coupled to the elongated skewer and having a surface for applying a force to a portion of the first fork prong of the bicycle. The cam follower engages the cam portion of the lever such that the cam follower moves along the elongated skewer as the lever rotates between the open position and the closed position. The surface of the cam follower applies the force to the portion of the first fork prong of the bicycle when the lever is at the closed position. Translation of the sleeve in the direction parallel to the longitudinal axis of the elongated skewer is substantially prevented when the lever is at the closed position and the first and second fork prongs of the bicycle are mounted to the elongated skewer.

In some embodiments, an assembly secures a bicycle having first and second fork prongs to a vehicle. The assembly includes an elongated skewer for mounting the first and second fork prongs of the bicycle thereon. The skewer has an end portion. The assembly also includes a lever rotatably coupled to the end portion of the elongated skewer. The lever has a cam portion. The assembly further comprises a cam follower movably coupled to the elongated skewer. The cam follower engages the cam portion of the lever such that the cam follower moves along the elongated skewer as the lever rotates. The assembly also includes a lock assembly separate from the lever and the cam follower that locks the lever at the closed position.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

FIG. 8 is a perspective view of a stop of a skewer assembly, according to an embodiment.

FIG. 9 is a perspective view of a sleeve of a skewer assembly, according to an embodiment.

FIG. 11 is a perspective view of a head assembly and a skewer assembly with a lever at an open position, according to an embodiment.

FIG. 12 is a perspective view of a skewer assembly with a lever removed for illustrative purposes, according to an embodiment.

FIGS. 13A-13D illustrates a method of using a skewer assembly of a bicycle carrier, according to an embodiment.

Figure 1:
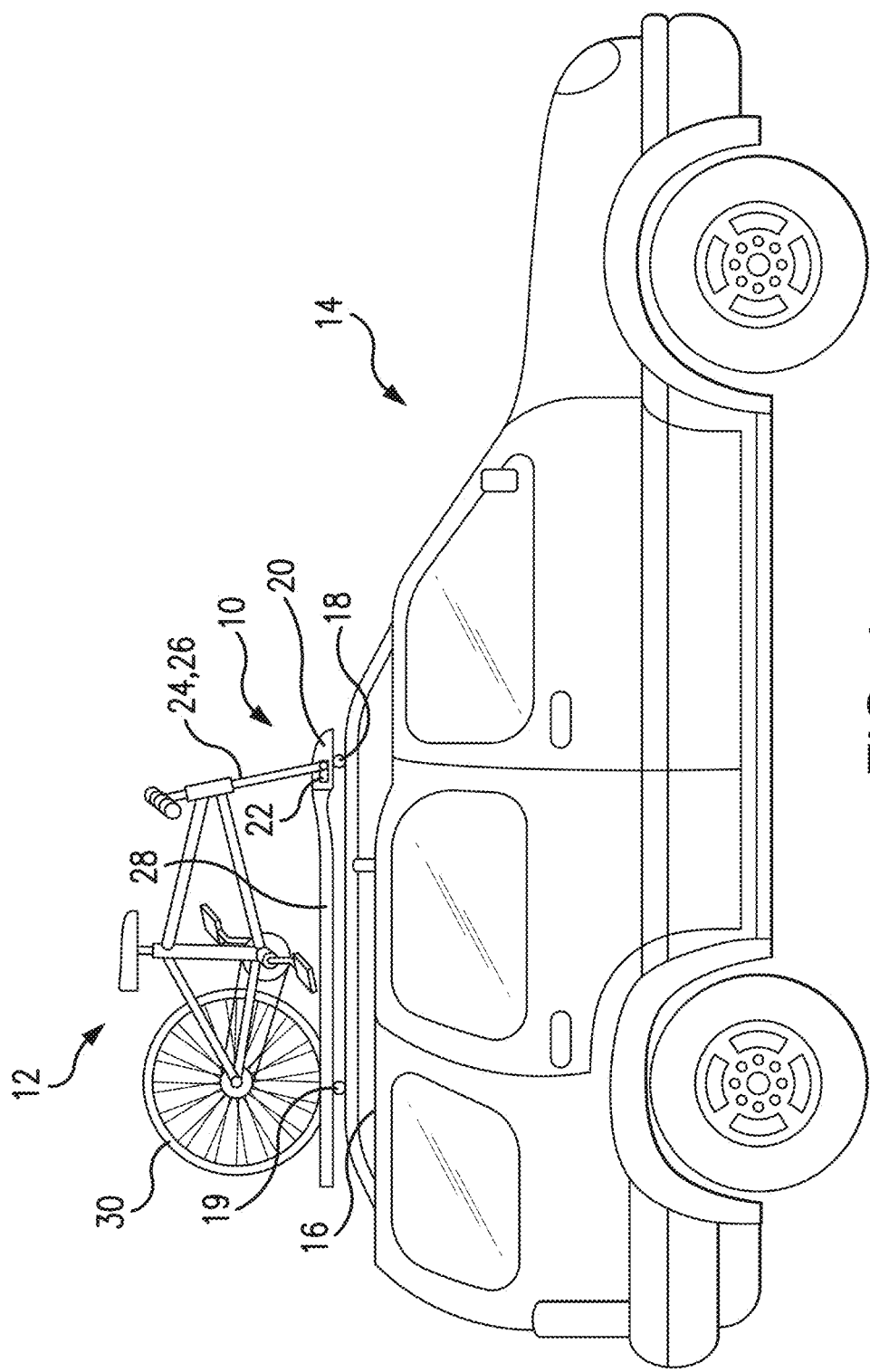
FIG. 1 is a side view of a bicycle carrier assembly mounted to a vehicle, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The disclosed embodiment(s) merely exemplify the invention. The scope of the invention is not limited to the disclosed embodiment(s). The invention is defined by the claims appended hereto.

The embodiment(s) described, and references in the specification to "an example," "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

Bicycle carrier assemblies that utilize fork mounting are typically located on a vehicle's roof. The elevated location of the roof can make securing the bicycle to the fork mount carrier difficult, especially when there is only one person securing the bicycle to the carrier. Additionally, the exterior location of the roof can provide access to thieves. The below described embodiments of bicycle carrier assemblies may provide advantages to the bike carrier user. For example, a skewer assembly of a bicycle carrier that uses non-threaded components (e.g., non-threaded distal end portions of skewers, sleeves, and stops described below) makes mounting a bicycle to the roof-mounted carrier easier because non-treaded components can be more quickly and easily assembled than threaded components, especially at an elevated location such as a vehicle roof. And for example, a skewer assembly of a bicycle carrier having a sleeve that couples to a stop such that the stop is locked to a skewer and that cannot be uncoupled from the stop when the fork prongs of a bicycle are secured to the carrier improves the security of the bicycle.

FIG. 1 illustrates a carrier assembly 10 for securing a bicycle 12 to a vehicle 14 to transport or store bicycle 12 according to an embodiment. Carrier assembly 10 can be configured to be mounted to any suitable surface of vehicle 14. For example, as shown FIG. 1, carrier assembly 10 is configured to be mounted to a roof 16 of vehicle 14, such as to front load bar 18 and rear load bar 19 mounted to roof 16 of vehicle 14. In other embodiments, carrier assembly 10 is configured to be mounted to surfaces other than roof 16 of vehicle 14.

In some embodiments, carrier assembly 10 includes a head assembly 20, a skewer assembly 22 configured to be selectively coupled to head assembly 20, and a wheel tray 28 coupled to head assembly 20. Head assembly 20 is configured to be mounted to any suitable surface of vehicle 14. For example, as shown FIG. 1, head assembly 20 is configured to be mounted to front load bar 18 on roof 16 of vehicle 14 using, for example, a U-bolt that wraps around load bar 18 and is fastened to head assembly 20. In other embodiments, head assembly 20 is configured to be mounted to surfaces other than roof 16.

Skewer assembly 22 is configured such that fork prongs 24 and 26 of a fork of bicycle 12 can be securely mounted to skewer assembly 22. In some embodiments, skewer assembly 22 is configured to secure either fork prongs having conventional slotted dropouts 27 or fork prongs having through-axel dropouts 27. In some embodiments, skewer assembly 22 is configured to be selectively coupled to head assembly 20 such that a user can selectively decouple skewer assembly 22 to head assembly 20 and recouple skewer assembly 22 to head assembly during normal operation of carrier assembly 10.

Wheel tray 28 is configured to be mounted to any suitable surface of vehicle 14. For example, as shown FIG. 1, wheel tray 28 is configured to be mounted to rear load bar 19 on roof 16 of vehicle 14 using, for example, a U-bolt that wraps around load bar 19 and is fastened to wheel tray 28. In some embodiments, wheel tray 28 is elongated as shown in FIG. 1. In some embodiments, wheel tray 28 is coupled to head assembly 20. Wheel tray 28 is configured for receiving a wheel of bicycle 12, for example, a rear wheel 30 of bicycle 12 as shown in FIG. 1. In some embodiments, wheel tray 28 defines a recess for receiving wheel 30. For example, wheel tray 28 can have a generally U-shaped cross-section. In some embodiments, wheel tray 28 includes a clamping device (not shown in FIG. 1), for example, a ratcheted strap, for securing rear wheel 30 to wheel tray 28. In some embodiments, wheel tray 28 is configured to be mounted to surfaces other than roof 16.

Figure 2:
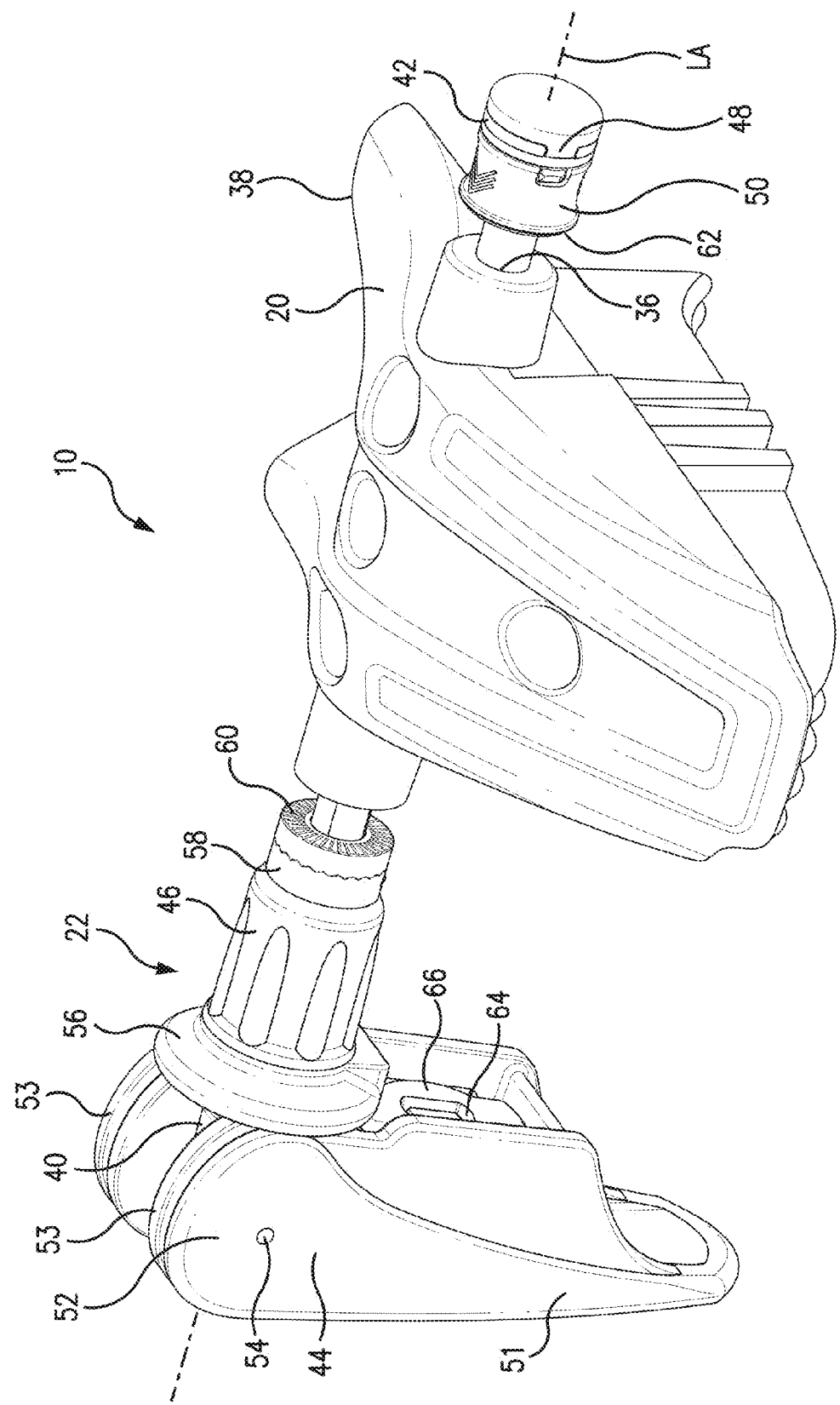
FIG. 2 is a perspective view of a head assembly and a skewer assembly with a lever at a closed position, according to an embodiment.
Figure 3:
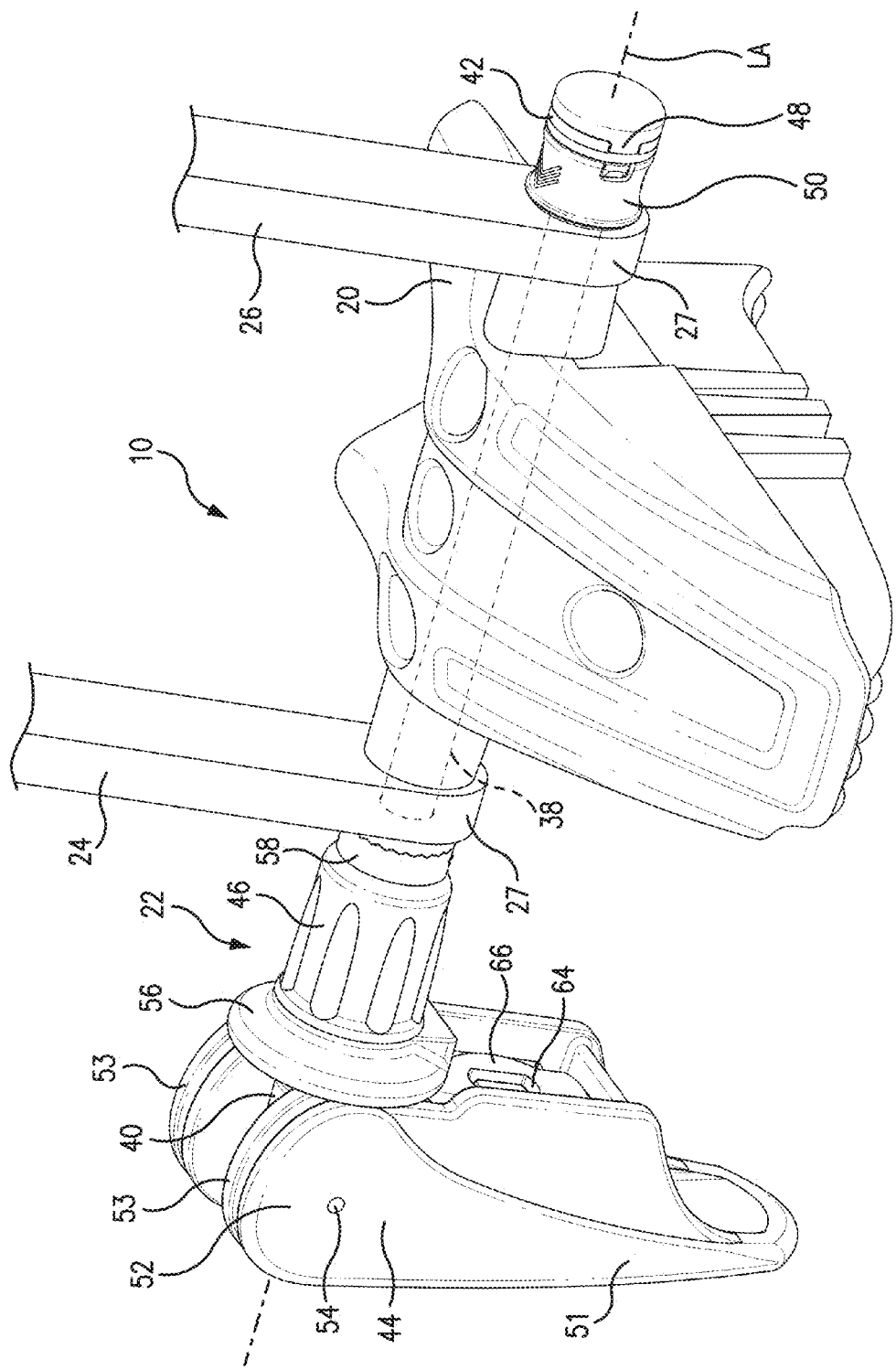
FIG. 3 is a perspective view of a head assembly and a skewer assembly with fork prongs of a bicycle mounted to the head assembly and the skewer assembly, according to an embodiment.

FIGS. 2, 3, and 11 illustrate head assembly 20 and skewer assembly 22 according to an embodiment. In use, fork prongs 24 and 26 of bicycle 12 are securely mounted to skewer assembly 22, and skewer assembly 22 is selectively and securely coupled to head assembly 20. For example, head assembly 20 defines a channel 36 configured to receive a skewer 38 of skewer assembly 22 to selectively couple skewer assembly to head assembly 20.

In some embodiments, head assembly 20 is stiff. That is, head assembly 20 is shaped and is made of a material such that head assembly 20 does not bend or flex when subjected to forces that occur during normal operation of carrier assembly 10 and vehicle 14. In some embodiments, head assembly 20 can withstand the forces applied by the weight of bicycle 12 in combination with the forces generated by the acceleration or deceleration of vehicle 14. In some embodiments, head assembly 20 is metal (e.g., aluminum or steel), plastic, or any other suitable material have a sufficiently high modulus of elasticity to resist forces that occur during normal operation of carrier assembly 10 and vehicle 14.

In some embodiments, as shown in FIGS. 2, 3, and 11, a length of channel 36 is less than the length of skewer 38 of skewer assembly 22. In such embodiments, when fully inserted within channel 36, a portion of skewer 38 extends beyond channel 36 on each side as discussed further below. In some embodiments, channel 36 is configured to closely receive skewer 38 of skewer assembly 22. For example, channel 36 can have a shape and size that closely corresponds to the shape and size of skewer 38. For example, if skewer 38 is cylindrical, channel 36 can have a cylindrical shape that closely corresponds to the cylindrical shape of skewer 38. In some embodiments, channel 36 is configured to slidably receive skewer 38. In some embodiments, the sliding coupling between channel 36 and skewer 38 does not require rotation of skewer 38. In some embodiments, the skewer 38 has a snug fit within channel 36.

FIGS. 2-7, 11, and 12 illustrate skewer assembly 22 according to an embodiment. In this embodiment, skewer assembly 22 includes skewer 38, a lever 44 rotatably coupled to skewer 38, a cam follower movably coupled to skewer 38 that moves along skewer 38 as lever 44 rotates, a stop 48 configured to be selectively coupled to skewer 38, and a sleeve 50 configured to be movably coupled to skewer 38 and configured to be selectively coupled to stop 48 such that stop 48 is locked to skewer 38.

In some embodiments, skewer 38 is an elongated member that defines a longitudinal axis LA. Skewer 38 has a proximal end portion 40 and a distal end portion 42. (In this application, proximal and distal may be defined relative to lever 44. Proximal is next to or nearest lever 44, and distal is situated away from lever 44.)

In some embodiments, skewer 38 is stiff. That is, skewer 38 is shaped and is made of a material such that skewer 38 does not bend or flex when subjected to forces that occur during normal operation of carrier assembly 10 and vehicle 14. In some embodiments, skewer 38 can withstand the forces applied by the weight of bicycle 12 in combination with the forces generated by the acceleration or deceleration of vehicle 14. In some embodiments, skewer 38 can be substantially cylindrical as shown in FIGS. 2 and 3. In some embodiments, skewer 38 is metal (e.g., aluminum or steel), plastic, or any other suitable material have a sufficiently high modulus of elasticity to resist forces that occur during normal operation of carrier assembly 10 and vehicle 14.

In some embodiments, skewer 38 can have a substantially uniform cross-sectional shape from proximal end portion 40 to distal end portion 42 as shown in FIGS. 2-7, 11, and 12. In other embodiments, skewer 38 can have a cross-sectional shape that substantially varies from proximal end portion 40 to distal end portion 42. In some embodiments, as shown in FIGS. 2-7, 11, and 12, skewer 38 has a substantially uniform cylindrical cross-sectional shape from proximal end portion 40 to distal end portion 42.

Lever 44 is rotatably mounted to skewer 38 such that lever 44 rotates about an axis of rotation RA. In some embodiments, lever 44 is mounted to skewer 38 at proximal end portion 40. In some embodiments, lever 44 is rotatably mounted to skewer 38 with a pivot pin 54 that defines axis of rotation RA. In some embodiments, pivot pin 54 passes through openings in lever 44. In some embodiments, lever 44 rotates between a closed position (e.g., as shown in FIGS. 2-7) and an open position (e.g., as shown in FIG. 11).

In some embodiments, lever 44 includes a handle portion 51 configured to allow a user to grasp lever 44 and rotate lever 44 between the closed position and the open position. In some embodiments, handle portion 51 of lever 44 is elongated. In some embodiments, handle portion 51 of lever 44 is sized to allow a user to wrap one or more fingers around handle portion 51 of lever 44 to manipulate lever 44.

In some embodiments, lever 44 also includes a cam portion 52. Cam portion 52 includes one or more contact surfaces 53 configured to slidingly engage one or more corresponding contact surfaces 47 of cam follower 46. As lever 44 rotates, contact surfaces 53 of cam portion 52 rotate and slidingly engage contact surface(s) 47 of cam follower 46. In some embodiments, contact surfaces 53 are a smooth curve as shown in FIGS. 2-7 and 11.

In some embodiments, the distance between a portion of contact surface 53 and axis of rotation RA varies. For example, in some embodiments, the distance between the portion of contact surface 53 that engages contact surface(s) 47 of cam follower 46 when lever 44 is at the closed position is greater than the distance between the portion of contact surface 53 that engages contact surface(s) 47 of cam follower 46 when lever 44 is at the open position. In such embodiments, due to this difference in distances, cam follower 46 moves toward distal end portion 42 of skewer 38 when lever 44 is moved from the open position to the close position, and cam follower 46 can move toward proximal end portion 40 of skewer 38 when lever 44 is moved from the closed position to the open position.

In some embodiments, lever 44 is stiff. That is, lever 44 is shaped and is made of a material such that lever 44 does not bend or flex when subjected to forces that occur during normal operation of carrier assembly 10 and lever 44. In some embodiments, lever 44 can withstand the forces applied due to the engagement between lever 44 and cam follower 46 as lever 44 is rotated between the open and closed position. In some embodiments, lever 44 can be plastic, metal, or any other suitable material having a sufficiently high modulus of elasticity to resist forces that occur during normal operation of lever 44.

In some embodiments, lever 44 has a center of mass aligned with axis of rotation RA and aligned with longitudinal axis LA of skewer 38 when lever 44 is at the open position. Because the center of mass of lever is aligned in such a configuration, the weight of lever 44 does not induce lever 44 to rotate, which helps keep lever 44 at the open position when the user is not touching lever 44.

Figure 7:
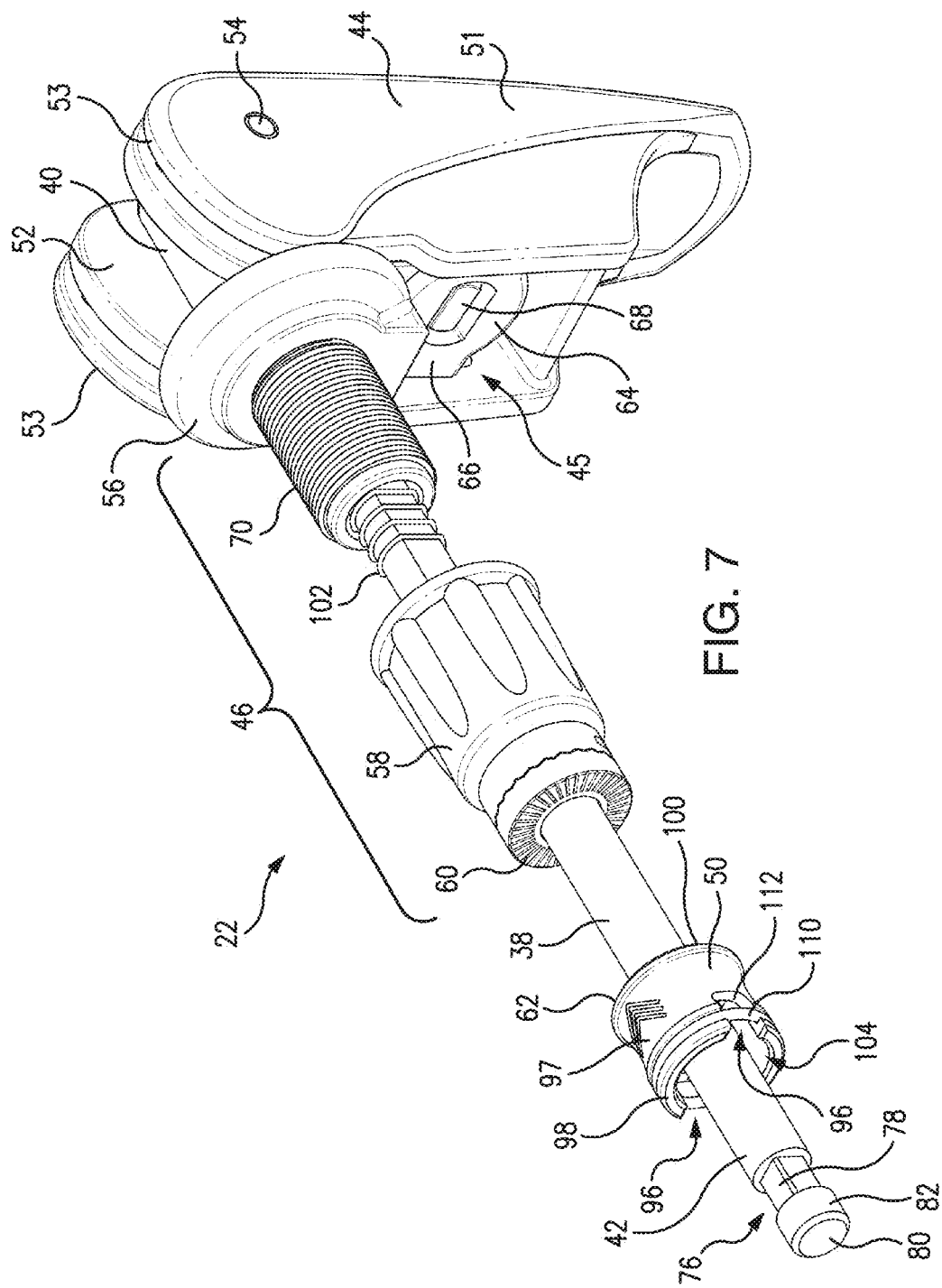
FIG. 7 is another exploded perspective view of a skewer assembly, according to an embodiment.

Cam follower 46 is movably coupled to skewer 38. For example, cam follower 46 can be configured to slide along skewer 38 in a direction parallel to longitiduinal axis LA. In some embodiments, cam follower 46 defines a channel that receives skewer 38 such that cam follower 46 moves between a first cam follower position when lever 44 is at the open position and a second cam follower position, which is distal to the first cam follower position, when lever 44 is at the closed position. In some embodiments, cam follower 46 can be biased to return to the first cam follower position. For example, as shown in FIG. 7, skewer assembly 22 can include a spring 102 mounted around skewer 38 that biases cam follower 46 to the first cam follower position in some embodiments.

Figure 4:
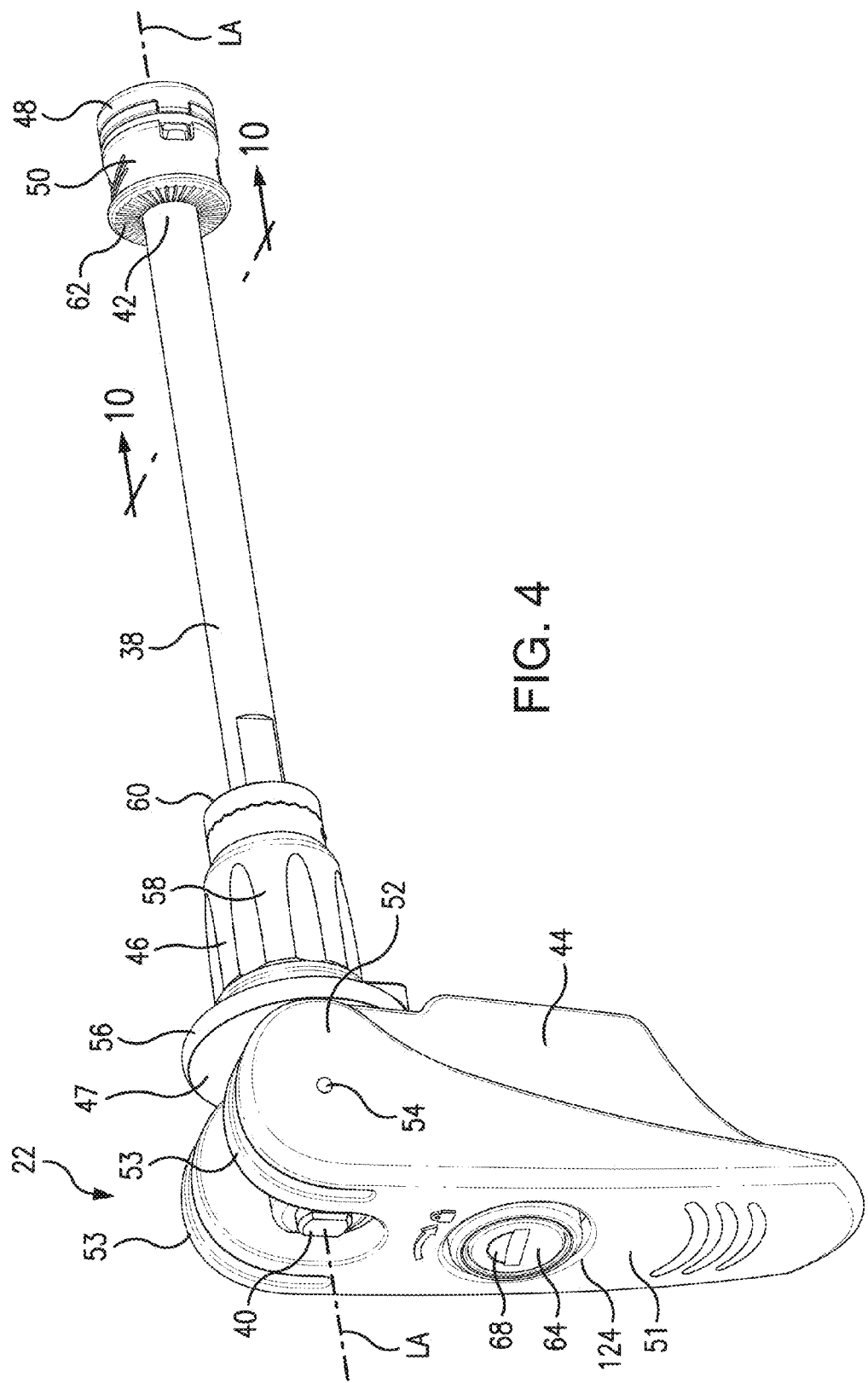
FIG. 4 is a perspective view of a skewer assembly, according to an embodiment.
Figure 5:
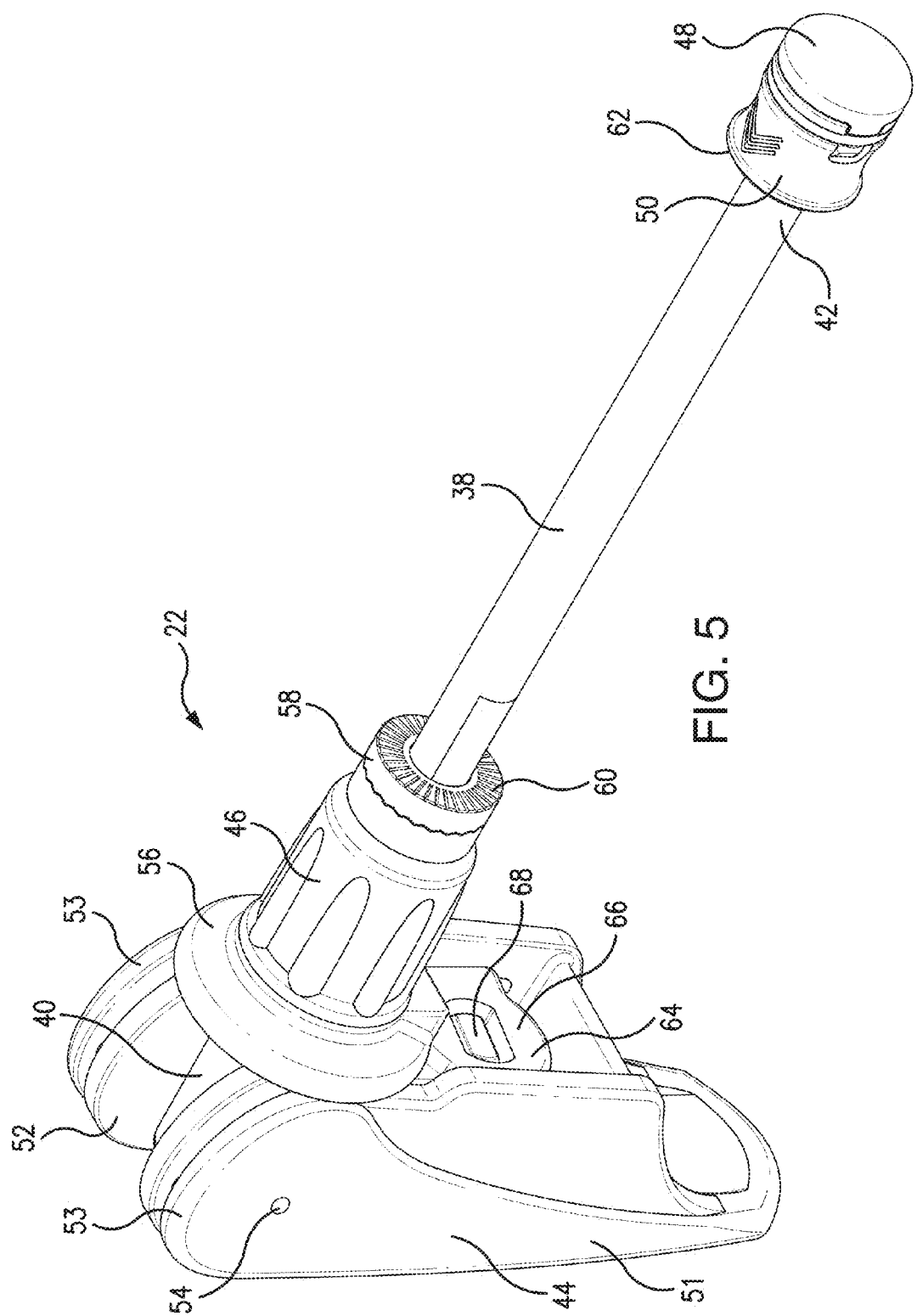
FIG. 5 is another perspective view of a skewer assembly, according to an embodiment.
Figure 6:
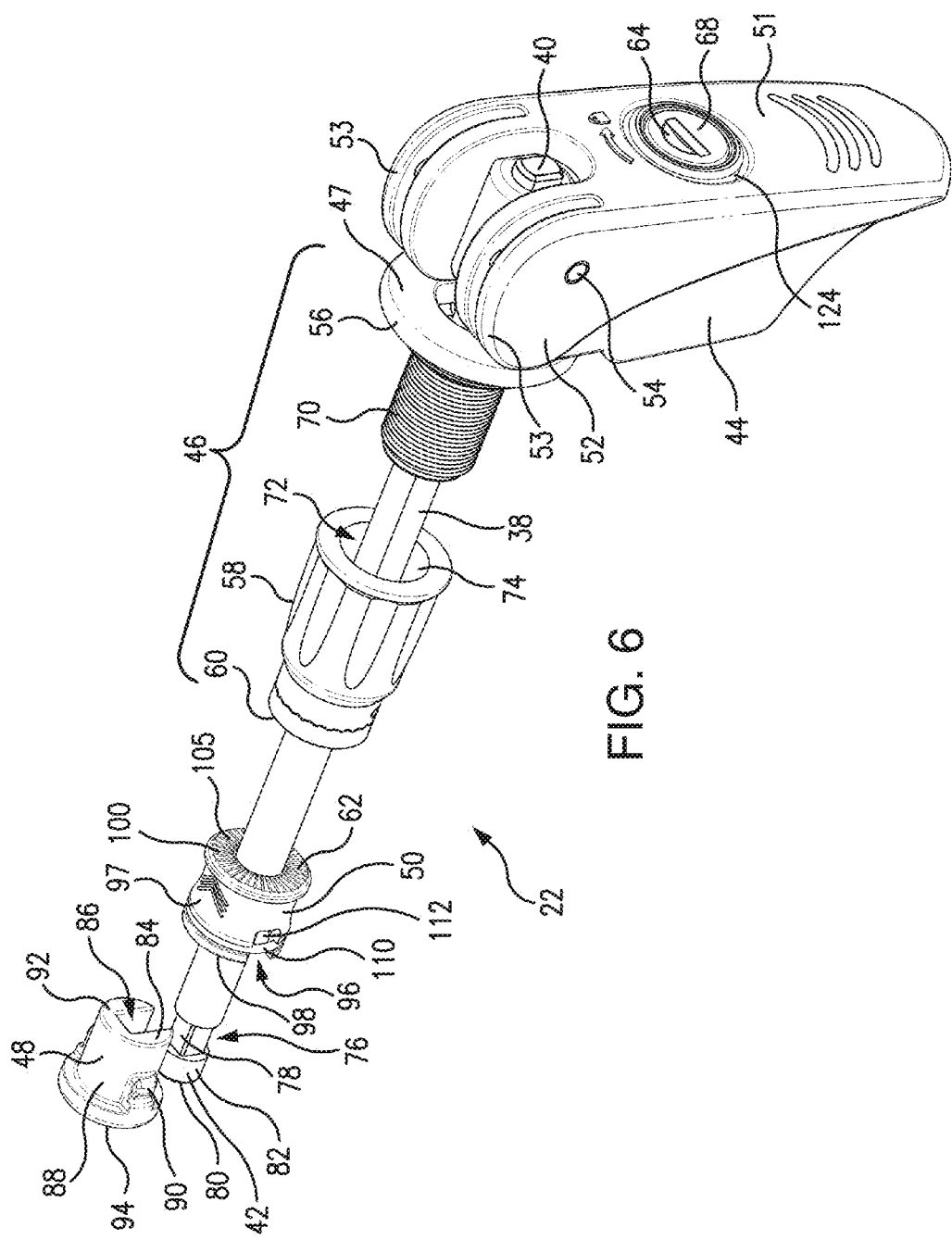
FIG. 6 is an exploded perspective view of a skewer assembly, according to an embodiment.

Cam follower 46 includes one or more contact surfaces 47 that engage one or more contacts surfaces 53 of cam portion 52 of lever 44. For example, as best seen in FIGS. 4, 6, and 12, cam follower 46 includes an annular, planar contact surface 47 that defines a proximal edge of cam follower 46 in some embodiments.

Cam follower 46 includes one or more contact surfaces 60 configured to apply, directly or indirectly, a force to first fork prong 24 of bicycle 12 when lever 44 is at the closed position. As shown in FIGS. 2-7, 11, and 12, contact surface 60 is configured to directly apply a force to first fork prong 24. But in other embodiments, contact surface 60 can indirectly apply the force to first fork prong 24 of bicycle 12. In some embodiments, contact surface 60 applies, directly (e.g., contact surface 60 directly contacts first fork prong 24) or indirectly (e.g., a washer or grommet may be disposed between contact surface 60 and first fork prong 24), a clamping force to first fork prong 24 in a direction parallel to longitudinal axis LA when lever 44 is at the closed position. In some embodiments, contact surface 60 is annular and defines a distal edge of cam follower 46 as best seen in FIGS. 2, 5, 7, and 11.

In some embodiments, cam follower 46 includes a plurality of separate portions. For example, as best seen in FIGS. 6 and 7, which are exploded views of skewer assembly 22, cam follower 46 include a first proximal portion 56 and a separate second distal portion 58. In some embodiments, first proximal portion 56 includes a proximal end portion that defines contact surface 53 of cam follower 46, and an externally threaded portion 70 that extends from the proximal end portion of first proximal portion 56. Externally threaded portion 70 can be substantially elongated and cylindrical in some embodiments as shown in FIGS. 6 and 7.

In some embodiments, first proximal portion 56 is configured to translate, but not rotate, relative to skewer 38. For example, the portion of skewer 38 along which first proximal portion 56 moves can be non-circular, and the channel defined by first proximal portion 56 that receives this portion of skewer 38 can have a corresponding non-circular shape. Accordingly, as cam follower 46 moves between the first cam follower position and the second cam follower position, first proximal portion 56 of cam follower 46 translates, but does not rotate, along longitudinal axis LA.

Second distal portion 58 of cam follower 46 is configured to be movably coupled to first proximal portion 56 of cam follower 46. Second distal portion 58 can define contact surface 60 that is configured to apply a force to first fork prong 24.

In some embodiments, second distal portion 58 can both move with first proximal portion 56 as first proximal portion 56 moves and move independently from first proximal portion 56. In some embodiments, as shown in FIG. 6, second distal portion 58 defines an internal cavity 72 configured to receive externally threaded portion 70. An interior surface 74 of second distal portion 58 that defines cavity 72 can have threads configured to mate with the threads of externally threaded portion 70 of first proximal portion 56. In such threaded embodiments, second distal portion 58 can be rotated relative to first proximal portion 56 to increases the length along the longitudinal axis LA between contact surface 60 of second distal portion 58 and contact surface 47 of first proximal portion 56. Conversely, second distal portion 58 can be rotated in the other direction relative to first proximal portion 56 to decrease the length along the longitudinal axis LA between contact surface 60 of second distal portion 58 and contact surface 47 of first proximal portion 56. The ability to change the length between contact surface 60 and contact surface 47 provides course adjustment for fitting various models of bicycles having varying distances between first and second fork prongs 24 and 26 to skewer assembly 22 of carrier assembly 10. In some embodiments, second distal portion 58 is configured such that when contact surface 60 applies a force to first fork prong 24 of bicycle 12, movement of second distal portion 58 relative to first proximal portion 56 is substantially prevented. In some embodiments, second distal portion 58 is elongated and substantially cylindrical or conical.

Skewer assembly 22 also includes lock assembly 64 configured to allow user to selectively prevent or substantially limit movement of lever 44. For example, in some embodiments, lock assembly 64 can be engaged to lock lever 44 at the closed position such that lever 44 cannot move from the closed position to the open position. In some embodiments, lock assembly 64 is separate from one or both of lever 44 and cam follower 46. For example, as best seen in FIG. 12, lock assembly 64 includes a housing 118 configured to holder a lock cylinder 68. Housing 118 defines a cavity that is shaped to closely correspond to the shape of lock cylinder 68 such that lock cylinder 68 can be slidably received within housing 118. In some embodiments, lock assembly 64 also includes one or more extending members 116 that extend away from proximal end portion 40 of skewer 38. For example, extending members 116 can extend in a direction substantially perpendicular to longitudinal axis LA of skewer 38. Housing 118 can be coupled to the end of the one or more extending members 116 such that lock cylinder 68 received within housing 118 is spaced apart from skewer 38.

Lock assembly 64 can include a movable lock cam 66. Lock cam 66 can rotate between a first engaged cam position and a second disengaged cam position. In some embodiments, lock cam 66 is rotatably coupled to housing 118 and has a portion that extends radially beyond the periphery of housing 118. In some embodiments, the portion extending beyond housing 118 is configured to engage a surface of lever 44 to lock lever 44 at the closed position when lock cam 66 is at the first engaged cam position. In some embodiments, lock cylinder 68 includes an arm configured to rotate as a user rotates a key inserted within the lock cylinder 68. The arm of lock cylinder 68 is operatively coupled to lock cam 66 to rotate lock cam 66 between the first engaged cam position and the second disengaged cam position.

In some embodiments, handle portion 51 of lever 44 defines an interior cavity 45 configured to receive lock assembly 64 when lever 44 is at the closed position. In such embodiments, lock cam 66 can be configured to engage an interior surface of lever 44 that defines interior cavity 45 when lock cam 66 is at the first engaged cam position.

As best shown in FIGS. 4, 6, and 11, handle portion 51 of lever 44 can define an opening 124 that is positioned such that when lever 44 is at the closed position opening 124 is aligned with lock cylinder 68 received within housing 118 of lock assembly 64. In some embodiments, opening 124 is circular and centered on handle portion 51 of lever 44.

In some embodiments, instead of being rotatably coupled to housing 118. Lock cam 66 is directly and rotatably coupled to lock cylinder 68.

Referring to FIGS. 6 and 7, in some embodiments, skewer 38 defines a notch 76 configured to translatably receive a portion of stop 48. In some embodiments, notch 76 is formed at distal end portion 42 of skewer 38. In other embodiments, notch 76 can be formed at intermediate portions of skewer 38 that extend beyond channel 36 of head assembly 20 when skewer 38 is received in channel 36. In some embodiments, notch 76 is configured to translatably receive stop 48 in a direction substantially perpendicular to longitudinal axis LA of skewer 38. In some embodiments, the coupling between stop 48 and notch 76 at distal end portion 42 of skewer 38 is a non-threaded coupling, for example, a simple sliding coupling. In such embodiments, distal end portion 42 of skewer 38, including notch 76 and portion 82 between notch 76 and distal edge 80, are non-threaded. In some embodiments, notch 76 extends around the entire periphery of skewer 38. For example, notch 76 can be an annular notch that extends radially about the circumference of skewer 38. In other embodiments, notch 76 extends around only a portion of the periphery or circumference of skewer 38. In some embodiments, as shown in FIGS. 6 and 7, the portion 78 of skewer 38 that defines the base of notch 76 is flat. In some embodiments, notch 76 is spaced apart from a distal edge 80 of skewer 38 by portion 82.

In some embodiments, stop 48 includes a protrusion 84 configured to be slidably received within notch 76 of skewer 38. In some embodiments, notch 76 and protrusion 84 are configured such that when protrusion 84 is received within notch 76 translation of stop 48 relative to skewer 38 is substantially prevented in a direction parallel to longitudinal axis LA. For example, in some embodiments, a proximal surface of skewer 38 defining notch 76 and a distal surface of skewer 38 defining notch 76 overlap proximal and distal surfaces of protrusion 84 in a direction parallel to the longitudinal axis LA of skewer 38, substantially preventing translation of stop 48 relative to skewer 38 in a direction parallel to the longitudinal axis LA of skewer 38. In some embodiments, notch 76 and protrusion 84 are configured such that when protrusion 84 is received within notch 76 rotation of stop 48 relative to skewer 38 is substantially prevented.

Referring to FIG. 8, in some embodiments, stop 48 defines a cavity 86 configured to receive distal end portion 42 of skewer 38. For example, in some embodiments, stop 48 includes a cylindrical body portion 88 that defines cavity 86. In some embodiments, the surfaces that define cavity 86 form protrusion 84 of stop 48.

In some embodiments, cavity 86 includes a plurality of portions having varying widths. For example, as shown in FIG. 8, cavity 86 includes a first portion 106 and second portion 108. First portion 106 has a width 111 that is less than a width 113 of second portion 108. Accordingly, shoulders 114 are formed at the interface of first portion 106 and second portion 108. In some embodiments, first portion 106 of cavity 86 is configured to receive the portion of skewer 38 defining notch 76, and second portion 108 is configured to receive portion 82 of skewer 38 between notch 76 and distal edge 80 of skewer 38. In some embodiments, cavity 86, including for example, first and second portions 106 and 108, are sized such that the portion of skewer 38 received within cavity 86 does not extend beyond the opening of cavity 86.

Figure 10:
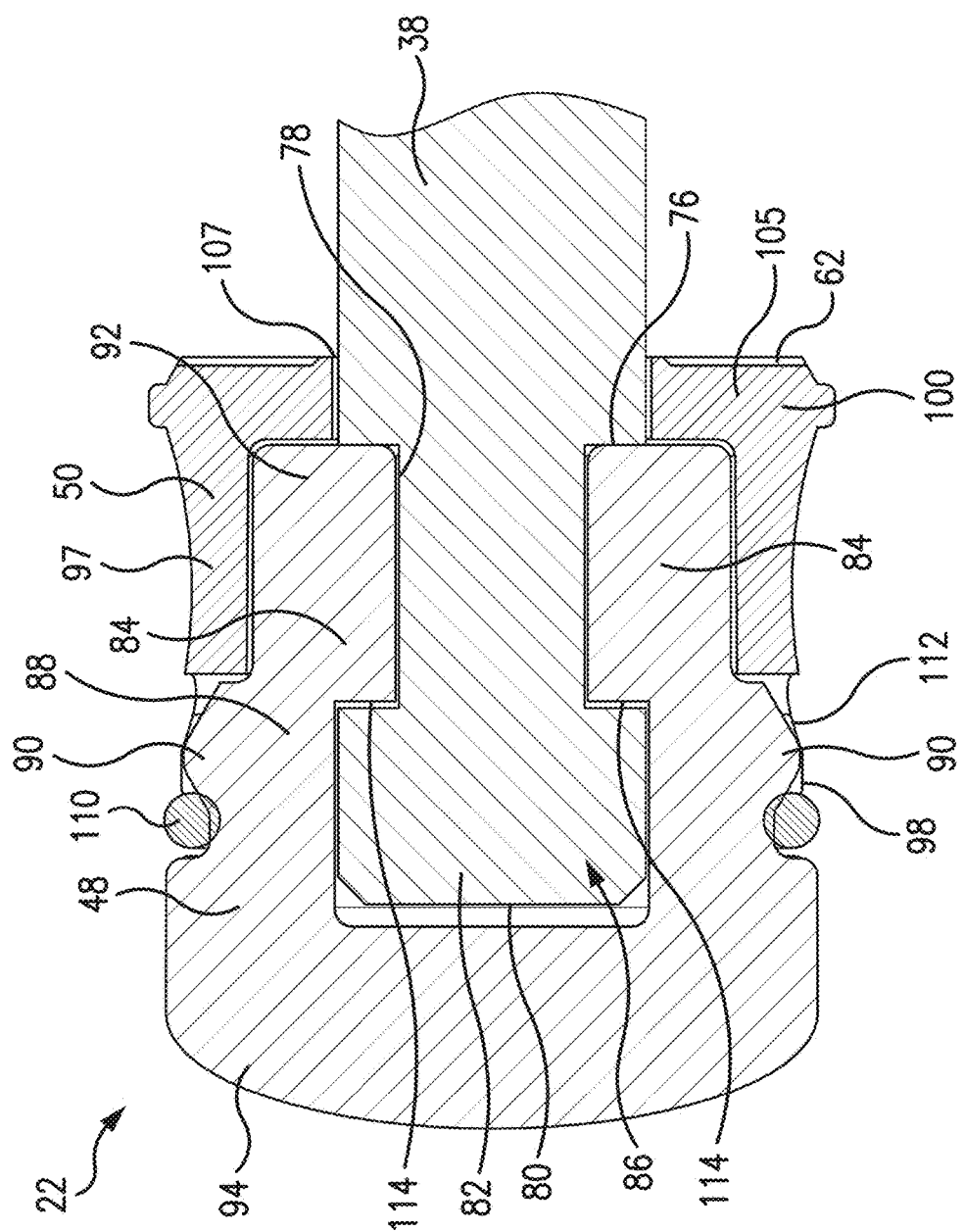
FIG. 10 is a cross-sectional view of a skewer, a sleeve, and a stop of a skewer assembly taken along plane 10-10 in FIG. 4, according to an embodiment.

Referring to FIG. 10, when stop 48 is coupled to skewer 38 by inserting protrusion 84 within notch 76, shoulder 114 overlaps a surface of skewer 38 defining a distal portion of notch 76 of skewer 38 in a direction parallel to the longitudinal axis LA of skewer 38, and a proximal end portion of body portion 88 of stop 48 overlaps a proximal surface of skewer 38 defining a proximal portion of notch 76 in a direction parallel to the longitudinal axis LA of skewer 38. This overlap substantially prevents translation of stop 48 relative to skewer 38 in a direction parallel to the longitudinal axis LA of skewer 38.

In some embodiments, stop 48 and sleeve 50 are configured to create an interference fit between each component. Referring to FIGS. 8 and 10, for example, stop 48 includes one or more protrusions 90 (for example, two protrusions 90 as shown in FIGS. 8 and 10) that are configured to create an interface fit with a recess 96 defined by sleeve 50. This interference fit is described further below. Protrusions 90 extend radially outward from body portion 88 of stop 48.

Referring to FIGS. 8 and 10, in some embodiments, cavity 86 of stop 48 is capped at its distal end by a distal end portion 94 of stop 48. In some embodiments, distal end portion 94 has a width (transverse to longitudinal axis LA) that is greater than a width (transverse to longitudinal axis LA) of body portion 88—at least a portion of distal end portion 94 extends radially outward from body portion 88. In some embodiments, the distal outer contour of distal end portion 94 is rounded. In some embodiments, a proximal end portion 92 of stop includes an opening to cavity 86.

Sleeve 50 is configured to be movably, for example, slidably, coupled to skewer 38. For example, sleeve 50 can be configured to translate (with or without rotation) relative to skewer 38 in a direction parallel to longitudinal axis LA of skewer 38. Referring to FIG. 9, in some embodiments, sleeve 50 includes a cylindrical outer wall 97 that defines an interior cavity 104 configured to receive skewer 38 and a portion of stop 48 as described below. In some embodiments, cylindrical outer wall 97 defines one or more recesses 96 configured to receive corresponding one or more protrusions 90 of stop 48 to create an interference fit therewith. For example, as shown in FIG. 9, cylindrical outer wall 97 defines a pair of recesses 96 that extend from a distal end portion 98 of sleeve 50 in a direction parallel to longitudinal axis LA of distal end portion 42 of skewer 38. Recesses 96 are configured to receive protrusions 90 of stop 48. In some embodiments, cylindrical outer wall 97 defines an annular groove that intersects recesses 96 and is configured to receive a resilient annular ring 110. In some embodiments, annular ring 110 extends around substantially the entire periphery of cylindrical outer wall 97, or in some embodiments, annular ring 110 extends around a portion of the periphery of cylindrical outer wall 97. Annular ring 110 and the surfaces of cylindrical outer wall 97 that define recess 96 collectively define an area 112. When sleeve 50 is moved relative to stop 48, protrusions 90 of stop 48 slide within recesses 96 of sleeve 50 until protrusions 90 pass ring 110 and reach area 112. When protrusions 90 reach area 112, an interference fit is created between sleeve 50 and stop 48. In some embodiments, ring 110 is configured to flex to allow protrusions 90 of stop 48 to pass underneath ring 110 into area 112, thereby creating the interference fit.

In some embodiments, referring to FIG. 9, sleeve 50 also includes a proximal wall 105 that caps cavity 104 at a proximal end portion 100 of sleeve 50. Proximal wall 105 defines an opening 107 for allowing skewer 38 to pass there through. In some embodiments, opening 107 is configured to closely receive skewer 38. For example, opening 107 can be sized and shaped to closely correspond to the size and shape of skewer 38 that passes through opening 107. In some embodiments, the outer surface of proximal wall 105 defines contact surface 62 of sleeve that is configured to apply, directly (e.g., contact surface 62 directly contacts second fork prong 26) or indirectly (e.g., a washer or grommet may be disposed between contact surface 62 and second fork prong 26), a force to second fork prong 26 of bicycle 12.

Referring to FIG. 10, in some embodiments, sleeve 50 is configured such that when protrusions 90 of stop 48 are received within area 112 of recess 96 of sleeve 50, distal end portion 98 of sleeve 50 is adjacent distal end portion 94 of stop 48. In some embodiments, distal end portion 94 of stop 48 is configured to substantially prevent sleeve 50 from translating in direction a parallel to longitudinal axis LA away from proximal end portion 40 of skewer as distal end portion 94 of stop 48 overlaps distal end portion 98 of sleeve 50 in a direction parallel to longitudinal axis LA.

To lock stop 48 to skewer 38, a user slides sleeve 50 onto skewer 38 with proximal wall 105 facing lever 44 and with skewer 38 passing through opening 107. Sleeve 50 is moved to a position between notch 76 and lever 44. Next, a user aligns protrusion 84 of stop 48 with notch 76 of skewer 38 as shown in FIG. 6. Then the user translates stop 48 in a direction substantially perpendicular to longitudinal axis LA of skewer 38 such that protrusion 84 is received within notch 76 of skewer 38. In some embodiments, at this point, portion 82 of skewer 38 is received within second portion 108 of cavity 86 of stop 48 and the portion of skewer 38 defining notch 76 is received within first portion 106 of cavity 86 of stop 48.

Next, the user slides sleeve 50 in direction parallel to longitudinal axis LA over stop 48 such that a portion of stop 48 is received within cavity 104 of sleeve 50 and protrusions 90 of stop 48 are received within area 112 of recess 96 to create an interference fit between stop 48 and sleeve 50. In some embodiments, when a portion of stop 48 is received within cavity 104 of sleeve 50, a portion sleeve 50 radially overlaps the portion of stop 48 received within cavity 104, substantially preventing stop 48 from translating relative to skewer 38 in a direction substantially perpendicular to longitudinal axis LA of skewer and away from skewer 38. FIG. 10 illustrates sleeve 50 coupled to stop 48, locking stop 48 to skewer 38, according to an embodiment. Protrusion 84 of stop 48 is received within notch 76 of skewer 38. The portions of body portion 88 of stop 48 defining first and second portions 106 and 108 of cavity 86 of stop 48 are received within cavity 104 of sleeve 50 such that cylindrical wall 97 of sleeve 50 radially overlaps body portion 88 of stop 48. This radial overlap substantially prevents stop 48 from translating relative to skewer 38 in a direction substantially perpendicular to longitudinal axis LA of skewer 38. The proximal surface of skewer 38 defining the proximal edge of notch 76 longitudinally overlaps the proximal portion protrusion 84 of stop 48, and the distal surface of skewer 38 defining the distal edge of notch 76 longitudinally overlaps the distal portion of protrusion 84 of stop 48. This longitudinal overlap substantially prevents translation of stop 48 relative to skewer 38 in a direction substantially parallel to the longitudinal axis LA of skewer 38. As shown in FIG. 10, second protrusions 90 of stop 48 extend into areas 112 of recess 96 of sleeve 50. This extension creates the interference fit between stop 48 and sleeve 50.

In some embodiments, stop 48 and sleeve 50 are stiff. That is, stop 48 and sleeve 50 are shaped and are made of materials such that stop 48 and sleeve 50 do not bend or flex when subjected to forces that occur during normal operation of carrier assembly 10. In some embodiments, stop 48 and sleeve 50 can be plastic, metal, or any other suitable material having a sufficiently high modulus of elasticity to resist forces that occur during normal operation of carrier assembly 10.

In some embodiments (not shown), stop 48 defines a cavity configured to receive a portion of sleeve 50 such that movement of stop 48 relative to skewer 38 is substantially prevented. For example, stop 48 can define an annular groove at proximal end portion 92, and cylindrical wall 97 of sleeve 50 can have a circumference such that a portion of cylindrical wall 87 is received within the annular grove at proximal end portion 92 of stop 48. In some embodiments, stop 48 defines a cavity configured to receive a portion of sleeve 50 such that a portion of stop 48 radially overlaps the portion of sleeve 50 received within the cavity of stop 48. For example, in some embodiments, a portion of cylindrical body portion 88 of stop 48 can radially overlap a portion of cylindrical wall 97 of sleeve 50.

Figure 13A:
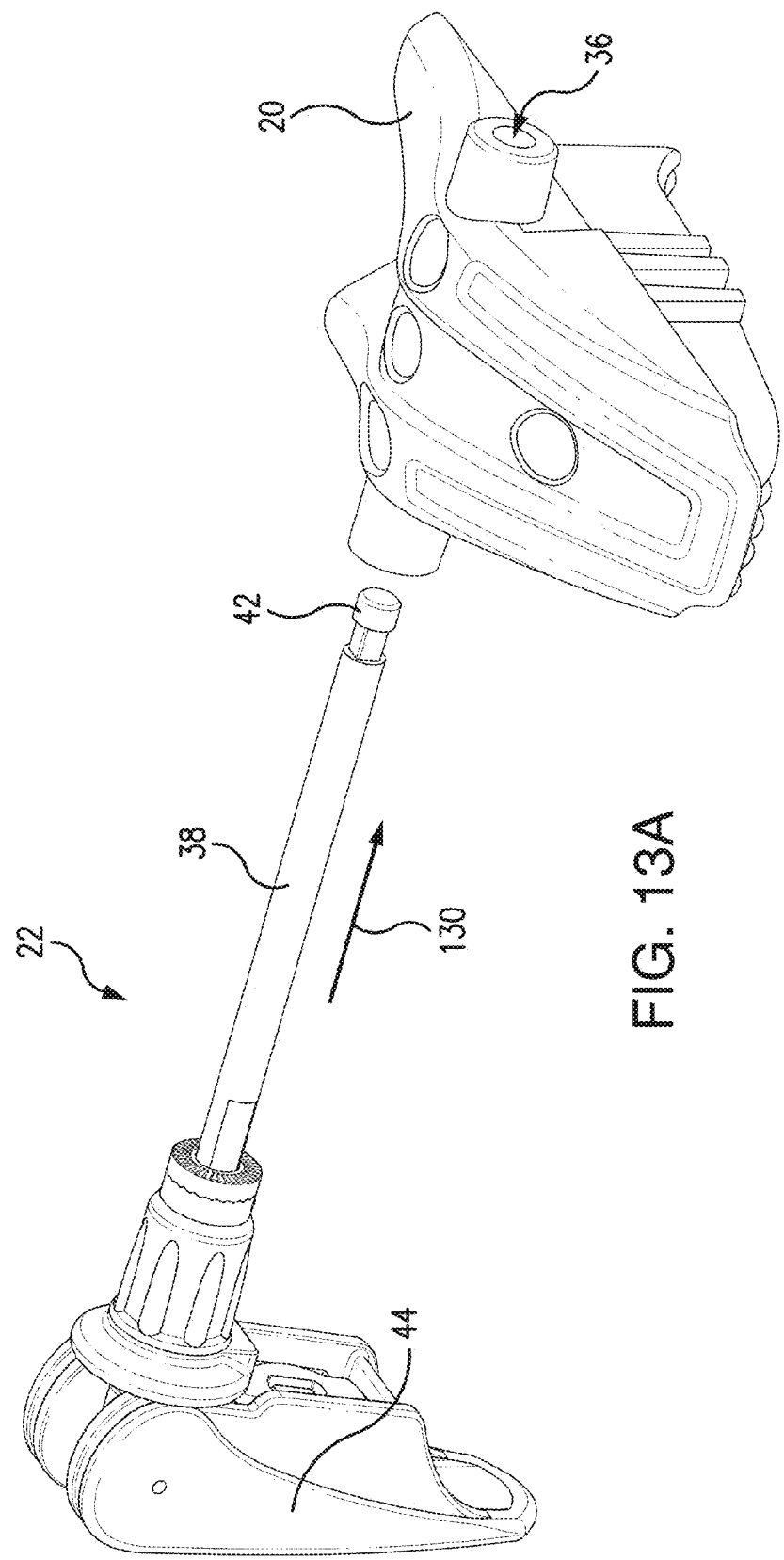

FIGS. 13A-13D illustrate an embodiment of using carrier assembly 10 that includes skewer assembly 22 according to an embodiment. In some embodiments, head assembly 20 and wheel tray 28 are mounted to a surface of vehicle 14, for example, to load bars 18 and 19 on roof 16 of vehicle 14. Before coupling skewer assembly 22 to head assembly 20, stop 48 and sleeve 50 are removed from skewer 38 of skewer assembly 22 as shown in FIG. 13A. For example, sleeve 50 is uncoupled from stop 48 by translating sleeve 50 in a direction parallel to longitudinal axis LA of skewer 38 toward lever 44 such that sleeve 50 no longer radially overlaps a portion of stop 48. Stop 48 can then be translated in a direction perpendicular to longitudinal axis LA and away from skewer 38 to uncouple stop 48 from skewer 38. Next, sleeve 50 can be translated in a direction parallel to longitudinal axis LA away from lever 44 until sleeve 50 is disengaged from skewer 38.

Once stop 48 and sleeve 50 are uncoupled from skewer 38 of skewer assembly 22, skewer 38 is inserted through channel 36 defined by head assembly 20 by advancing skewer assembly 22 in direction 130. Skewer assembly 22 is advanced in direction 130 such that distal end portion 42 of skewer 38 extends from channel 36 on one side of channel 36 as shown in FIG. 13B. In some embodiments, skewer 38 is inserted through channel 36 such that lever 44 is on the same side as the user who is loading bicycle 12 onto carrier assembly 10.

Next, sleeve 50 is recoupled to skewer 38. For example, skewer 38 is aligned with opening 107 defined by wall 105 of sleeve 50, and then sleeve 50 is translated relative to skewer 38 in a direction 132 parallel to longitudinal axis LA of skewer such that skewer 38 passes through opening 107 of sleeve 50. Sleeve 50 is moved to a position between notch 76 and head assembly 20 that does not obstruct notch 76. Then, stop 48 is recoupled to skewer 38. For example, protrusion 84 of stop 48 is aligned with notch 76 of skewer 38, and then stop 48 is translated relative skewer 38 in a direction 134 perpendicular to longitudinal axis LA of skewer 38 such that protrusion 84 is seated within notch 76 of skewer 38.

Referring to FIG. 13C, stop 48 is then locked to skewer 38 by coupling sleeve 50 to stop 48. For example, sleeve 50 is than translated relative to skewer 38 in a direction 136 parallel to longitudinal axis LA toward distal end portion 42 of skewer 38 such that a portion of stop 48 is received within cavity 104 defined by cylindrical wall 97 of sleeve 50. Sleeve 50 is translated relative to stop 48 until protrusions 90 of stop 48 are received within area 112 of recesses 96, which creates an interference fit between stop 48 and sleeve 50 as shown in FIG. 13D. Stop 48 is now locked to skewer 38, translation of stop 48 in a direction perpendicular and parallel to longitudinal axis LA is substantially prevented. In some embodiments, coupling stop 48 and sleeve 50 to distal end portion 42 of skewer 38 does not require the use of threads. In such non-threaded embodiments, the user can quickly and easily couple stop 48 and sleeve 50 to skewer 38. Additionally, in such non-threaded embodiments, theft protection can be improved because stop 48 cannot be removed simply by applying a large magnitude of torque to stop 48 to decouple stop 48 from skewer 38.

After a wheel of bicycle 12, for example, the front wheel, is removed from first and second fork prongs 24 and 26 to expose dropouts 27, slotted or through-axel dropouts, of first and second fork prongs 24 and 26. With lever 44 at the open position, dropouts 27 are aligned with skewer 38, and first and second fork prongs 24 and 26 are mounted to skewer 38 such that respective dropouts 27 surround skewer 38. As shown in FIG. 3, first fork prong 24 is on one side of head assembly 20, and second fork prong 26 is on the other side of head assembly 20. A portion of first fork prong 24 is between contact surface 60 of cam follower 46 and a surface of head assembly 20, and a portion of second fork prong 26 is between contact surface 62 of sleeve 50 and a surface of head assembly 20.

To ensure that a sufficient amount of force is applied to first and second fork prongs 24 and 26 when lever 44 is rotated to the closed position, second distal portion 58 of cam follower 46 is be moved relative to first proximal portion 56 of cam follower 46 and toward distal end portion 42 of skewer 38. For example, a user can rotate second distal portion 58 relative to first proximal portion 56, to move second distal portion 58 in a direction toward distal end portion 42 of skewer 38. In some embodiments, when contact surface 62 of sleeve 50 is engaged with second fork prong 26, second distal portion 58 of cam follower 46 is moved until contact surface 60 of cam follower 46 contacts first fork prong 24 or is near first fork prong 24.

Next, to secure bicycle 12 to carrier assembly 10, lever 44 is rotated from the open position to the closed position. As lever 44 rotates to the closed position, cam portion 52 of lever 44 moves cam follower 46 in a direction toward distal end portion 42 of skewer 38, which decreases the distance between contact surface 60 of cam follower 46 and contact surface 62 of sleeve 50. Eventually, contact surface 60 of cam follower 46 engages first fork prong 24, and contact surface 62 engages second fork prong 26 such that each contact surface applies a force toward head assembly 20. This force application clamps first fork prong 24 between cam follower 46 and head assembly 20, and clamps second fork prong 26 between sleeve 50 and head assembly 20, which secures bicycle 12 to carrier assembly 10. At this point, translation of sleeve 50 relative to skewer 38 in a direction parallel to longitudinal axis LA and toward proximal end portion 40 of skewer 38 is substantially prevented by second fork prong 26, which locks sleeve 50 with stop 48 which in turn locks stop 48 on skewer 38.

To lock lever 44 at the closed position and, thus, maintain securement of bicycle 12 to carrier assembly 10, lock assembly 64 can be engaged. For example, a user can insert a key into lock cylinder 68 of lock assembly 64 to rotate the cylinder's arm which in turn rotates lock cam 66 to a position that engages a surface of lever 44. The engagement between lock cam 66 and the surface of lever 44 substantially prevents lever 44 from rotating from the closed position to the open position. Thus, contact surfaces 60 and 62 continue to apply forces to first and second fork prongs 24 and 26, clamping first and second fork prongs 24 and 26 to head assembly 20. At this point, bicycle 12 is secured to carrier assembly 10 such that bicycle 12 can be transported or stored by vehicle 14.

To remove bicycle 12 from carrier assembly 10 (and thus vehicle 14), lock assembly 64 is disengaged. For example, a user can insert a key into lock cylinder 68 of lock assembly 64 to rotate the cylinder's arm, which rotates lock cam 66 to a position that disengages the surface of lever 44. The disengagement between lock cam 66 and the surface of lever 44 allows lever 44 to rotate from the closed position to the open position.

Next, lever 44 is rotated from the closed position to the open position. As lever 44 rotates to the open position, cam portion 52 of lever 44 allows cam follower 46 to move toward proximal end portion 40 of skewer 38. In some embodiments, spring 102 automatically biases cam follower 46 toward proximal end portion 40 of skewer 38 as lever 44 rotates to the open position. As cam follower 46 moves towards the proximal end portion 40, the distance between contact surface 60 of cam follower 46 and contact surface 62 of sleeve 50 increases. As this distance increases, the forces applied to first and second fork prongs 24 and 26 by contact surface 60 and contact surface 62, respectively, are reduced or eliminated, unclamping first and second fork prongs 24 and 26 from head assembly 20 and skewer assembly 22.

First and second fork prongs 24 and 26 can then be moved away from skewer 38, releasing bicycle 12 from carrier assembly 10.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An assembly for securing a bicycle having first and second fork prongs to a vehicle, the assembly comprising:
    an elongated skewer for mounting the first and second fork prongs of the bicycle thereon and having an end portion;
    a lever rotatably coupled to the end portion of the elongated skewer and having a cam portion;
    a cam follower movably coupled to the elongated skewer, wherein the cam follower engages the cam portion of the lever such that the cam follower moves along the elongated skewer as the lever rotates; and
    a lock assembly, separate from the lever and the cam follower, that locks the lever at a closed position, wherein the lock assembly is coupled to the end portion of the elongated skewer such that the lock assembly is disposed around the end portion of the elongated skewer.

2. The assembly of claim 1, wherein the elongated skewer is non-threaded.

3. The assembly of claim 1, wherein the lock assembly comprises a fixed member directly coupled to the end portion of the elongated skewer.

4. The assembly of claim 3, wherein the fixed member comprises a pivot pin extending transversely through the fixed member and the end portion of the elongated skewer, and wherein the pivot pin is coupled to the lever.

5. The assembly of claim 1, wherein the lock assembly comprises a lock housing and a lock cylinder disposed within the lock housing.

6. The assembly of claim 1, wherein the lock assembly comprises one or more extending members that extend away from the end portion of the elongated skewer.

7. The assembly of claim 6, wherein the one or more extending members extend in a direction perpendicular to a longitudinal axis of the elongated skewer.

8. The assembly of claim 3, wherein the lock assembly comprises an extending member having a first end coupled to the fixed member.

9. The assembly of claim 8, wherein the lock assembly comprises a lock cylinder coupled to a second end of the extending member, and wherein the lock cylinder is spaced from the end portion of the elongated skewer.

10. The assembly of claim 5, wherein the lever comprises an opening configured to receive the lock housing when the lever is at the closed position.

11. The assembly of claim 10, wherein the lever comprises a circular opening, wherein the circular opening is aligned with the lock cylinder when the lever is at the closed position.

12. An assembly for securing a bicycle having first and second fork prongs to a vehicle, the assembly comprising:
    an elongated skewer for mounting the first and second fork prongs of the bicycle thereon and having an end portion;
    a lever rotatably coupled to the end portion of the elongated skewer and having a cam portion;
    a cam follower movably coupled to the elongated skewer, wherein the cam follower engages the cam portion of the lever and moves along the elongated skewer as the lever rotates; and
    a lock assembly, separate from the lever and the cam follower, that locks the lever at a closed position, wherein the lock assembly comprises:
        a fixed member directly coupled to the end portion of the elongated skewer,
        an extending member having a first end coupled to the fixed member, and
        a lock cylinder coupled to a second end of the extending member, wherein the lock cylinder is spaced from the end portion of the elongated skewer.

13. The assembly of claim 12, wherein the extending member extends in a direction perpendicular to a longitudinal axis of the elongated skewer.

14. The assembly of claim 12, wherein the lever has a center of mass aligned with an axis of rotation and a longitudinal axis of the elongated skewer when the lever is at an open position.

15. The assembly of claim 12, wherein the lock assembly comprises a movable lock cam that rotates to engage a surface of the lever to lock the lever at the closed position.

16. The assembly of claim 15, wherein the lock assembly comprises a lock housing, and wherein the movable lock cam is rotatably coupled to the lock housing.

17. The assembly of claim 16, wherein the movable lock cam extends radially beyond a periphery of the lock housing and is configured to engage a surface of the lever to lock the lever at the closed position.

18. A system for securing a bicycle having first and second fork prongs to a vehicle roof, the system comprising:
    a carrier mounted to the vehicle roof, the roof having a proximal edge and a distal edge;

a skewer coupled to the carrier configured to receive the first and second fork prongs of the bicycle thereon, the skewer having a first end portion disposed toward the proximal edge of the roof and a second end portion disposed toward the distal edge of the roof;

an adjustment assembly coupled to the first end portion of the skewer, wherein the adjustment assembly comprises:

a lever rotatably coupled to the first end portion of the skewer and having a cam portion, a cam follower movably coupled to the skewer, wherein the cam follower engages the cam portion of the lever and moves along the skewer as the lever rotates, and a lock assembly, separate from the lever and the cam follower, that locks the lever at a closed position, wherein the lock assembly is coupled to the first end portion of the skewer and disposed around the first end portion of the skewer.

19. The system of claim 18, wherein the lever has a center of mass aligned with an axis of rotation and a longitudinal axis of the skewer when the lever is at an open position such that the adjustment assembly and lock assembly remain in a fixed position.

20. The system of claim 18, wherein the skewer is non-threaded.

* * * * *